(12) United States Patent
Röhrle et al.

(10) Patent No.: US 7,711,117 B1
(45) Date of Patent: May 4, 2010

(54) MANAGEMENT OF A COMMUNICATION NETWORK AND THE MIGRATION OF MOBILE AGENTS

(75) Inventors: Klaus Röhrle, Stuttgart (DE); Ernö Kovacs, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1268 days.

(21) Appl. No.: 09/607,674

(22) Filed: Jun. 30, 2000

(30) Foreign Application Priority Data

Jul. 5, 1999 (EP) .................................. 99112983

(51) Int. Cl.
*H04K 1/00* (2006.01)
*H04L 29/06* (2006.01)

(52) U.S. Cl. ...................... 380/270; 713/155; 713/156; 726/10

(58) Field of Classification Search ................. 713/201, 713/155; 726/10; 380/270
See application file for complete search history.

(56) References Cited

U.S. PATENT DOCUMENTS

| | | | | |
|---|---|---|---|---|
| 5,214,702 A | * | 5/1993 | Fischer ......................... | 380/30 |
| 5,603,031 A | | 2/1997 | White et al. | |
| 5,774,552 A | * | 6/1998 | Grimmer ...................... | 713/156 |
| 5,796,833 A | * | 8/1998 | Chen et al. ................... | 713/156 |
| 6,094,679 A | * | 7/2000 | Teng et al. ................... | 709/220 |
| 6,128,740 A | * | 10/2000 | Curry et al. .................. | 713/200 |
| 6,134,658 A | * | 10/2000 | Multerer et al. ............. | 713/175 |
| 6,202,157 B1 | * | 3/2001 | Brownlie et al. ............. | 726/1 |
| 6,233,601 B1 | * | 5/2001 | Walsh .......................... | 709/202 |
| 6,324,645 B1 | * | 11/2001 | Andrews et al. ............. | 713/157 |
| 6,421,781 B1 | * | 7/2002 | Fox et al. ..................... | 726/4 |

OTHER PUBLICATIONS

A Review of Email Security Standards, Lunblade, p. 7, Jul. 8, 1997, http://www.isoc.org/inet97/proceedings/A4/A4_1.HTM.*
Applied Cryptography, Schneier, p. 576 1996.*
David Chess, IBM Reseach Report "Itinerant Agents for Mobile Computing" RC 20010 Mar. 27, 1995, pp. 7-23.*
William Farmer, "Security for Mobile Agents: Authentication and State Appraisal" Proceedings of the European Symposium on Research in Computer Security, Sep. 1996, pp. 118-130.*
Ordille J J: "When Agents Roam, Who Can You Trust?" Proceedings. The First Annual Conference of Emerging Technologies and Applications in Communications (CAT. No. 96TB100035), Proceedings of COM'96. First Annual Conference on Emerging Technologies and Applications in Communications, Portland, OR, USA, pp. 188-191, XP002124935.

(Continued)

*Primary Examiner*—Christopher J Brown
(74) *Attorney, Agent, or Firm*—Oblon, Spivak, McClelland, Maier & Neustadt, L.L.P.

(57) ABSTRACT

A technique for managing the migration of mobile agents to nodes of a communication network is proposed. The trustworthiness of at least one node (102b) of the network is checked (301). In case the trustworthiness exceeds a pre-set trust threshold, a trust token for the checked node (102b) is generated (306) and the trust token is stored (303) in the network. In advance to a migration of a mobile agent (104a) to a node of the network it is verified (108, 109) if a valid trust token is existing for the corresponding node (102b). The migration of the mobile agent (104a) is restricted (107) to nodes having a valid trust token.

19 Claims, 4 Drawing Sheets

OTHER PUBLICATIONS

Varadharajan V et al: "An Approach to Designing Security Model for Mobile Agent Based Systems" IEEE Global Telecommunications Conference, US, New York, NY: IEEE, p. 1600-1606, XP000805177.

P. Nikander: "An Architecture for Authorization and Delegation in Distributed Object-Oriented Agent Systems" Doctoral Dissertation, Mar. 19, 1999, pp. 1-70, XP002124936.

Papaioannou T et al: "Using Mobile Agents to Improve the Alignment Between Manufacturing and its IT Support Systems" Robotics and Autonomous Systems, NL, Elsevier Science Publishers, Amsterdam, vol. 27, No. 1-2, p. 45-57, XP004164318.

Tardo J et al: "Mobile Agent Security and Telescript" Digest of Papers. COMPCON '96. Technologies for the Information Superhighway. Forty-First IEEE Computer Society International Conference (CAT. No. 96CB35911), COMPCON '96. Technologies for the Information Superhighway Digest of Papers, Santa Clara, CA, pp. 58-63, XP002124937.

* cited by examiner

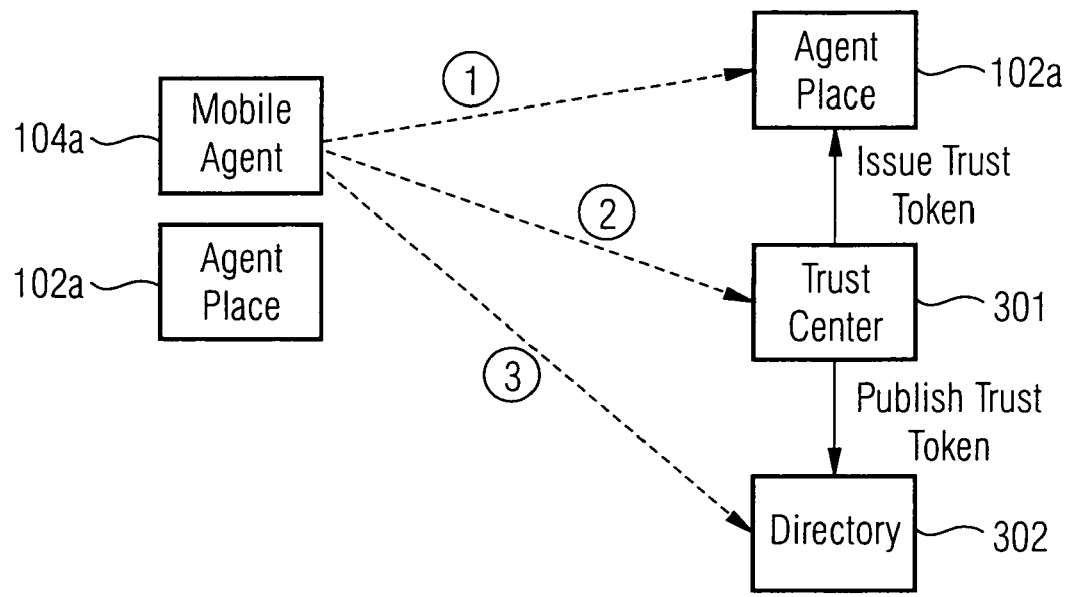

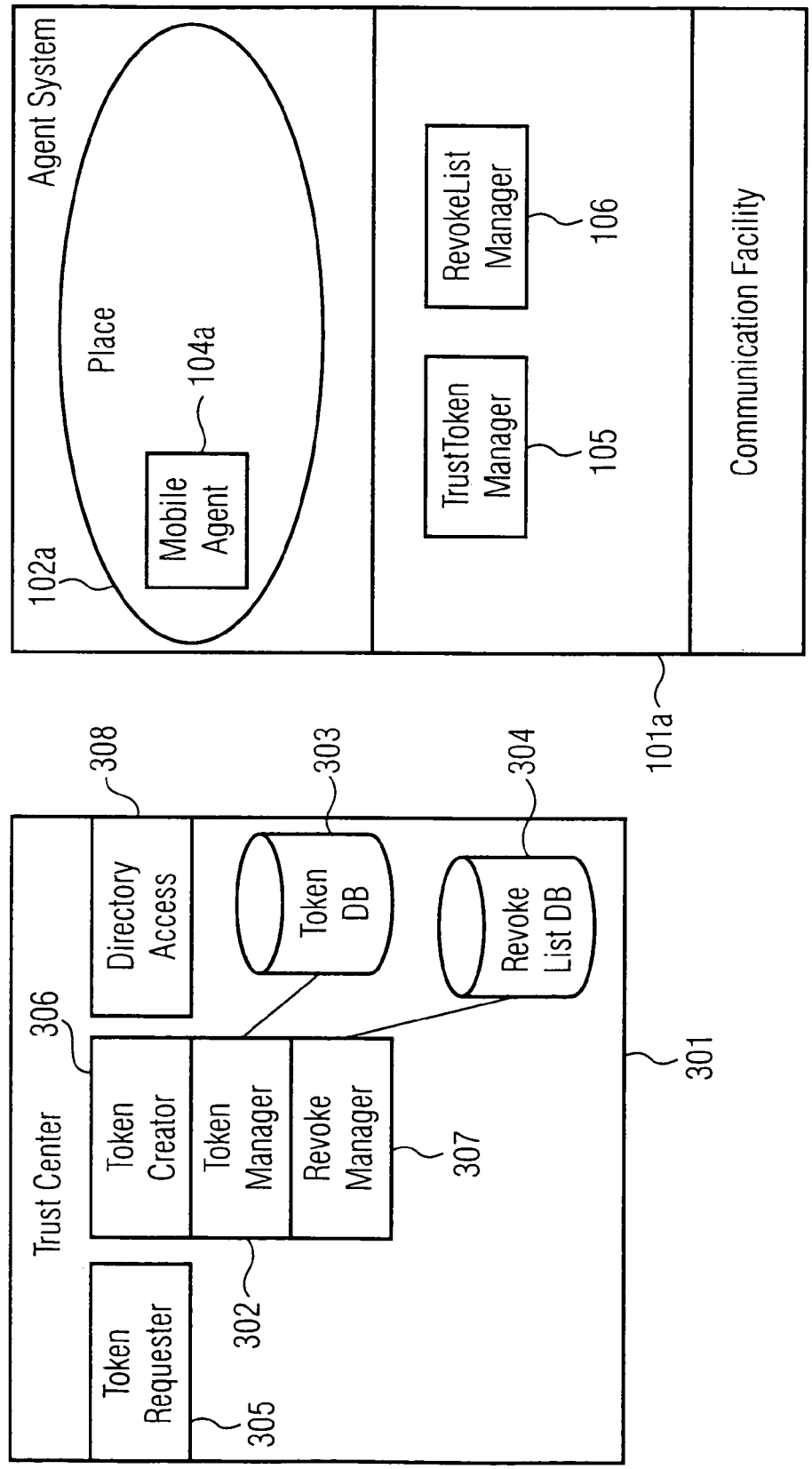

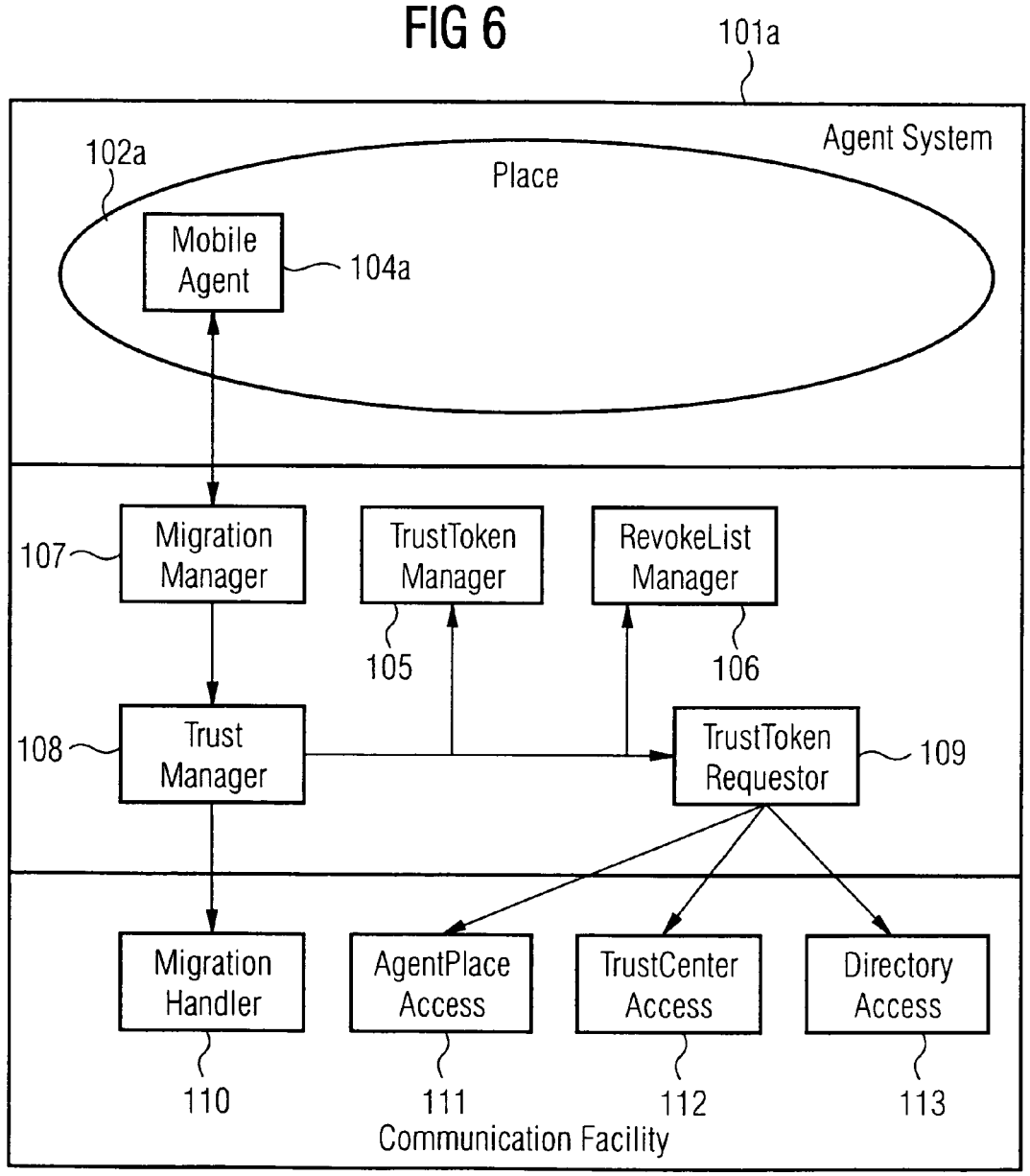

MANAGEMENT OF A COMMUNICATION NETWORK AND THE MIGRATION OF MOBILE AGENTS

The present invention relates to a communication network, a method for managing a communication network and method for managing the migration of mobile agents to nodes of a communication network.

The present invention has its application in the field of communication networks, and preferably in the field of mobile computing, wireless communication, mobile multimedia middleware and so-called mobile agents. One particular application is the control (management) of the migration of so-called mobile agents between places in the network.

Communication is concerned with providing networked services over (for example wireless) networks to the users. So-called mobile agents is a new computing concept enabling the transfer of an executing piece of software (code) from one node of the computer network to another node. One example for a mobile code system are Java applets loaded over the Internet in a Web browser system.

The concept of mobile agents is set forth in detail in U.S. Pat. No. 5,603,031. Regarding the general concept of the mobile agent technology therefore reference is made to said prior art.

FIG. 1 shows the basic operation of a mobile agent system. An agent system offers mobile agents an execution environment which is called a place. Mobile agents are a piece of executing software being capable of migrating from one agent system to another. On all places mobile agents can access local services offered.

FIG. 1 shows the migration of a mobile agent 104a between two agent systems 101a, 101b. The agent systems contain execution environments which are called places 102a, 102b. In the places local services 103a, 103b are provided offering services 106 to the mobile agent 104a. In the migration process 105 the mobile agent is serialised on place 102a and the state and the code of the agent is transferred to the place 102b. In the place 102b the mobile agent 104a is recreated from the transferred state and code. Then the execution thread of the mobile agent 104a can be executed in the place 102b.

In the current state of the art agents are migrating between computing nodes on the Internet. There are several security-related problems in conjunction with mobile agents, e.g. to protect the agent place against a malicious agent. One hard problem is the protection of an agent against a malicious host.

A malicious host can perform several kinds of attacks to a mobile agent like e.g. spy out its code or data, manipulate its code or data, execute it incorrectly or deny the execution at all. At the moment there are no known security mechanisms, which protect an agent against all these attacks except of using trusted hardware.

A malicious host is only a problem for agents whose owners cannot trust the place operators. Trust means in this context that the owner of the agent knows (or at least hopes) that the place will not attack one of its agents. As there is no solution for protecting agents against malicious places, there are some approaches to circumvent this problem by allowing agents only to move to hosts trusted by the owner of the mobile agent.

These approaches are especially important when the itinerary of an agent is not known in advance. In most agent environments an agent can retrieve during runtime the location of certain services and then visit these locations. In this case the agents itinerary is determined dynamically. This is in contrast to a static approach to inform a mobile agent in advance concerning which places are not rusted by the owner of the mobile agent. It is to be noted that even the trustworthiness places can change in time, i.e. a trustworthy place can become non-trustworthy later on which results in problems when informing a mobile agent in advance about the trustworthiness of places to be visited.

A mobile agent owner might want to restrict the agent in a way that it is not allowed to migrate to places the mobile agent owner does not trust. To achieve this, the agent needs a means to find out if a given place is trusted by his user or not.

This can be done either by an "organisational" approach, which means that only trustworthy parties can start a place. The disadvantage of this approach is that it leads to an agent environment, which is not "open" anymore (open in the sense that everybody can start a place).

Another approach is to specify the trusted places an agent is allowed to migrate in advance. In this case, the agent carries a list of trusted places and either the agent system or the agent itself checks on a migration whether the agent is allowed to go to its destination or not.

This approach also has a big disadvantage: it is not always clear in advance whether a place is trusted or not, which can severely reduce the number of places an agent is allowed to migrate. A user normally 'knows' only a small number of places in the agent environment. He can of course only judge agent systems he knows. Therefore he will probably not trust most of the places which means that his agents are only allowed to migrate to a very limited set of places. This may limit the usefulness of an agent environment significantly.

In view of the above prior art it is the object of the present invention to provide for a technique allowing for a facilitated trust check in networks. It is particularly the object of the invention to provide such a trust check for the management of the migration of mobile agents in a communication network.

The trust check technique should furthermore be open for a dynamic in-line trust check approach.

The above object is achieved by means of the features of the independent claims. The dependent claims develop further the central idea of the invention.

According to the present invention therefore a method for managing a communication network is provided. The trustworthiness of at least one node of the network is checked. The trustworthiness is compared to a pre-set threshold and in case the trustworthiness exceeds the pre-set trust threshold, a trust token for the checked node is generated and the trust token indicating the fact that the corresponding node has passed the trustworthiness check is stored in the network.

The validity of a token can be ensured by cryptographic measures such as, for example, digital signatures.

The step of checking the trustworthiness of at least one node of the network can be executed by another node of the network having a trust centre function which is called trust centre in the following description.

A predetermined expiry date limiting the life span of a trust token can be added to the trust token.

According to another aspect of the invention a method for managing the migration of mobile agents to nodes of a communication network is provided. The trustworthiness of at least one node of the network is checked. In case the trustworthiness exceeds a pre-set trust threshold, a trust token for the checked node is generated and stored in the network. In advance to migration of mobile agent to a node of the network, it is verified if a valid trust token is existing for the corresponding node. The migration of the mobile agent is restricted to nodes having a valid trust token.

The verification of the trust token can be executed dynamically during the run time of a mobile agent.

The step of checking the trustworthiness of at least one node of the network can be executed by at least one third node of the network having a trust centre function.

A list of names of trust centre nodes can be attached to a mobile agent. The list can be protected against attempts of manipulation by cryptographic measures such as f.e. digital signatures.

The step of verification if a valid trust token is existing for a corresponding node in advance to a migration of the mobile agent can be effected by querying the corresponding target node for valid trust token. Additionally or alternatively at least one trust centre node can be queried and/or at least one storage unit storing valid trust token and the corresponding nodes of the network can be queried.

According to the present invention furthermore a communication network is provided. At least one trust centre node of a network checks the trustworthiness of at least one node of the network. The trust centre node has a token creator for generating a trust token for the checked node in case the trustworthiness exceeds a pre-set trust threshold. The trust centre can be another node of the network as each checked node. The trust token and the corresponding checked nodes can be stored in a trust manager database being part of or being connected to the trust centre node.

At least one mobile agent place can be provided in the network for managing the migration of mobile agents in the communication network. The mobile agent places can be signed to access the trust manager database of at least one trust centre node.

The mobile agent place can comprise a local database to store information fetched from the trust manager database of a trust centre node.

A list of trust centre nodes can be attached to a mobile agent managed by a mobile agent place.

In the following preferred embodiments of the present invention will be explained with reference to the figures of the enclosed drawings.

FIG. 3 shows the relationship between a trust centre node, an agent place and a directory service, FIG. 4 shows the system architecture for a trust centre, FIG. 5 shows a trust token with some related data fields, and FIG. 6 explains the architecture of a agent system.

Figure 1:
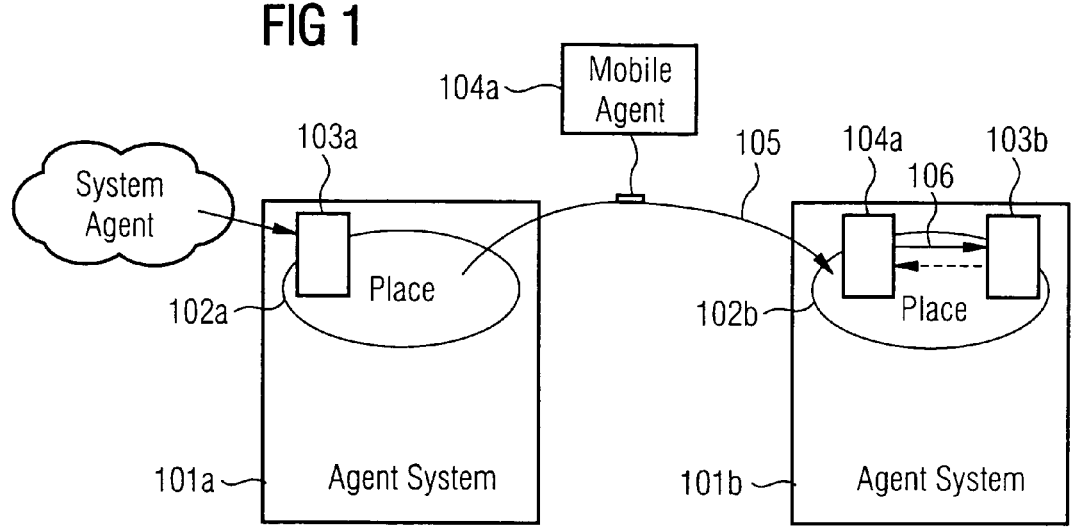
FIG. 1 shows the migration of a mobile agent.

FIG. 1 has already been explained in the introductory part of the description.

Figure 2:
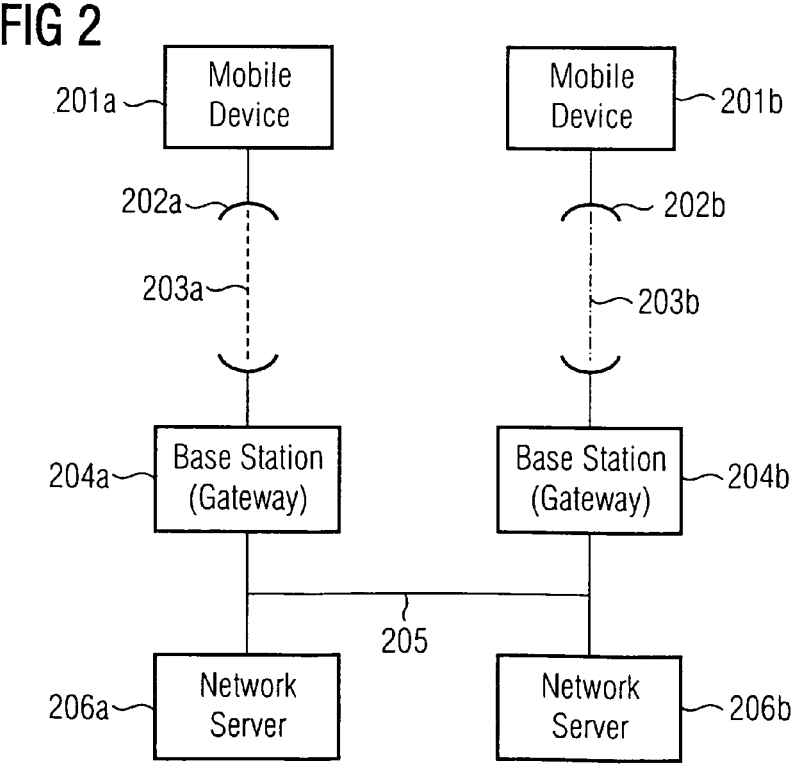
FIG. 2 shows a wireless computing scenario.

FIG. 2 shows a typical wireless computing scenario. Several mobile devices are connected over a wireless network link to a base station. They use different wireless network equipment. The base stations are connected over a network (e.g. the Internet) with each other and with network servers.

FIG. 3 shows the relationship between the trust centre a agent place and a directory service. The trust centre generates a trust token and issues it to the agent place. This place can then declare its trustworthiness using the issued trust token. Agent wishing to migrate can request the trust tokens from several places (the target agent place, the trust centre, a directory or others). The checks can be performed by the agent or by the agent system.

A place may get trust tokens from various trust centres. Trust token may also be made public by the trust centres or the place, so everybody can verify that a place is trusted by a specific trust centre ("Publishing of the trust centre"). This can be done through the use of a directory service like the international X.500 directory. FIG. 3 explains this process.

FIG. 4 shows the system architecture for a trust centre. The trust centre contains a token creator module, which creates a trust token after the credibility of a agent place is checked. It used cryptographic and digital signatures for ensuring the validity of his statement. The trust token is managed by the trust manager module which stores the trust token and addition information in a trust token database. The revoke manager module is a supplementary module which enables to define tokens as revoked after they are issued. Although this is not a 100% solution it increases the likelihood of preventing accidental migration to untrusted places. The revoke list can be distributed to interested agent places to improve the checking of the trust tokens. The token requester module handles request for issued trust tokens from agent places. The directory access module allows access to a directory service.

There is a plurality of implementation possibilities for the revoking procedure:

a mobile agent is provided with a revoke list the trust centre is accessed to query revoked places, and/or a central revoke manager is provided As shown in FIG. 4 a trust centre consists of several modules, each performing a specific task. The token creator module creates the trust token. The trust token consists of some information about the trusted agent place. This information is digital signed with the private key of the trust centre so that user of the trust token can verify that the content of it was created by the trust centre.

On the side of the agent place, trust tokens are managed by the trust token manager. This module can keep a cache of already available trust tokens. The revoke list manager module stores a list of revoked trust tokens. It can synchronise its content with the revoke list database from the trust centre.

The information, if a place is trustworthy or not, is determined dynamically during the runtime of the agent. This is achieved by providing adding trusted third parties—called trust centres. An owner of an agent cannot only specify places he trusts but also trust centres. The list an agent carries around will therefore consist of place names and trust centre names. This list is called "System Permission List" (SPL). FIG. 5 explains the System Permission List as an example implementation of a trust token. The data fields have the following meaning:

trustLevel—The level of trust given by the trust centre to the referenced agent place.

agentPlace—The name of the agent place.

startDate—The start date from which on the trust token is valid.

expiryDate—The date when the trust token expires.

issuingAuthority—The name of the issuing trust centre.

serialNumber—A serial number for the trust token.

owner—The owner of the agent place.

Depending on the application requirements, the trust token might have additional data fields.

FIG. 6 explains the architecture of a "Agent System" in conjunction with the trust mechanism. When a agent wants to migrate to another agent place. It calls the migration operation (usually called "Go"). Execution control is then transferred to the migration manager. This module in turn calls the trust manager to ensure that the agent is allowed to migrate. The trust manager checks locally with the trust token manager whether a required trust token is already stored. It further checks with the revoke list manager to ensure the status of the trust token. If it cannot find a required token locally, it uses the trust token requester to get a trust token from the agent place, a directory service, or the trust centre. If the new trust token passes the revoke list manager test, the agent is handed to the migration handler module which performs the migration procedure.

A place can get a kind of license (a trust token) from a trust centre, if the trust centre is convinced that the place is trustworthy. To determine, if a place is trustworthy the trust centre can e.g. check the owner of the place, the software etc. One can even think of checking the everyday operation of the organisation operating the agent place. Every trust centre may have different requirements a place has to fulfil before it gets a license from it. Even a single trust centre may have different levels of such requirements resulting in different levels of licenses.

If a place fulfils the requirements of a trust centre it gets the license ("Issuing of the trust token"). This kind of license is called a trust token. A trust token is a statement digitally signed by the issuing trust centre, containing the information that a specified place is trusted by the issuer and also some additional information. Trust tokens are very similar to certificates used in authentication protocols. A trust centre is very similar to a certificate authority in the same context.

Trust centres may charge places for their services.

FIG. 6 explains the architecture of a sending agent system. An agent wishing to migrate to another agent place issues this request to the migration manager. The migration manager inquires a trust manager about the trustworthiness of the other agent place. The trust token requester retrieves the trust token using one of the possible ways (e.g. accessing the peer agent place, accessing the directory or accessing the issuing trust centre).

If the trust token allows the migration the mobile agent will be handed to the migration handler which executes the migration step.

If an agent now wants to migrate to a place and the place is not contained in the list of trusted places. It tries to check whether the place has a trust token from a trust centre the agent trusts. This can be done in several ways.
1. The agent may get one of the wanted trust tokens by asking the destination place.
2. He can ask the trust centres
3. He can ask other services which stores and manages trust tokens (e.g. a directory service).

If the agent can get a trust token issued by a trust centre, which is in his SPL he is allowed to migrate. Otherwise the agent is not allowed to migrate. The whole test can be done by the agent himself or by the agent place.

If the agent is allowed to migrate then there is something like a trust chain: the user trusts a trust centre, which in turn trusts the destination place.

One problem of a trust token concept is that sometimes an issued trust token has to be revoked. This is a hard problem as trust tokens are distributed without control of the trust centre. By adding an expiry date, trust tokens have a limited lifetime so that the trust centre can be sure that a trust token is not valid anymore. Furthermore, the trust centre can maintain a revoke list which contains all tokens revoked before their expiry date.

The system required for this invention consists of the trust centre, the trust token data structure and the integration of a trust manager into the agent system.

A created trust token is stored in the token manager database. This database manages all issued trust tokens together with additional information when the cite was checked, which tests have been performed, etc. The trust token is then communicated to the agent place which can add the trust token to its database of locally managed trust tokens. This database is managed by the trust token manager component of an agent place.

If a trust token has to be revoked early, the revoked trust token are stored in a database managed by the revoke manager. Note that because of the distributed nature of the system, trust token remain valid until their expire date is over. The revoke operation is just an additional mean for agent places to verify that a given trust token is still valid. As this comparison with the trust centre revoke list is not mandatory, the trust token cannot reliably be revoked early.

The trust centre can furthermore use the directory access module to store the trust token in a generally accessible directory service. Using the token requester, anybody can request an issued trust token for a specific agent place.

In an agent place, the collection of trust tokens is stored locally in a database managed by the trust token manager. If trust tokens are requested from another place, the trust token is fetched from the database and transmitted to the requester. An instance requesting a trust token can therefore use either the agent place, the directory or the trust centre itself for requesting the trust token. Other means are also possible.

EXAMPLE

Agent a wants to migrate from place p1 to place p2. His SPL does not contain p2, but the trust centres tc1 and tc2. Now it must be checked if p2 owns a trust token from either tc1 or tc2. To achieve this p2 is asked to provide all trust tokens it owns. P2 owns trust tokens from the trust centres tc3, tc2 and tc4. It sends theses tokens to p1. P1 now checks whether one of the trust tokens from p2 matches a trust centre in the SPL of a. This is the case as p2 owns a trust token from tc2 and tc2 is in the SPL of a. The agent is therefore allowed to migrate.

Main Advantageous Differences Between the Invention and the State of the Art

By introducing a third party we gain the advantage that the user must not know all places his agents may travel by himself without allowing the agents to visit untrusted places. Our approach therefore does not restrict the number of places as much as the original approach did.

As trust centres may be able to perform a lot of checks to a place or can make a contract with the place owner, the trust relationship between the trust centre and the place is in most cases much more justified than the trust relationship between an agent owner and the place.

The original approach had the problem that the SPL could become very large as the user specified single places. As this list has to be moved together with the agent this is not a very good thing—especially if the agent migrates over a wireless network link with limited bandwidth. According to the present approach the SPL is much shorter, as the user can specify with one entry implicitly a whole set of agent systems.

One example of an application of the present invention is a bank offering services on the base of mobile agents. Several places for mobile agents are offered. The bank is its own trust centre for these places and issues trust token for said places. A mobile agent which wants to use the services offered by the bank includes the trust token of the bank in its SPL.

The invention as shown above presents means and methods for managing trusted places in a mobile agent system. The apparatus restricts the migration operation of the mobile agents to the boundaries defined by the trusted places. The invention contains means and methods for controlling the trustworthiness of an agent place. The migration operation of a mobile agent is restricted by a system using trusted system concepts. The system has accessed to a list of trusted systems defined by the user or trust labelling authorities. It can check whether a migration is allowed on the basis if the target node of the network is trusted or not.

The invention focuses on the way how the trustworthiness of a place is determined. In addition to the usual list of places which are allowed to be visited, a user can define a list of trust checking agencies (trust centres). These trust centres are certificating agent places for the trustworthiness. If a place is considered trustworthy, the trust checking agency is issuing a trust certificate which is stored at the agent place. Trust certificates are encoded to prevent the manipulation. Before migrating to an agent place, the mobile agent can request the trust certificates of that place and check them against its own list of trust checking agencies. If a trust certificate fits, the agent is allowed to migrate.

The invention claimed is:

1. A method for managing the migration of mobile agents to nodes of a communication network, comprising:
    checking, with a processor, at least one node of the network in relation to a predetermined mobile agent to determine whether or not the at least one node provides a trusted execution environment with respect thereto;
    generating a trust token for the checked node at a trust center if the checking exceeds a preset trust threshold and storing the trust token in a memory of the trust center, the trust token indicating that the corresponding node has passed the checking and the trust token includes a name of the trust center that issued the trust token;
    verifying if a valid trust token exists for the corresponding node in advance to a migration of the predetermined mobile agent to a node of the network; and
    migrating the predetermined mobile agent by sending the predetermined mobile agent exclusively to nodes having the valid trust token,
    wherein a list of trust center nodes is attached to a mobile agent, a trust token which is issued by a trust center of the list is a valid trust token, a trust token which is not issued by a trust center of the list is not a valid trust token, and the list includes trust centers which are specified by an owner of the mobile agent.

2. The method according to claim 1 wherein the verifying if a valid trust token exists for the corresponding node is executed dynamically during the runtime of the predetermined mobile agent.

3. The method according to claim 1 wherein the checking of at least one node of the network is executed by the trust center.

4. The method according to claim 1 wherein verifying if a valid trust token exists for the corresponding node in advance to a migration of the predetermined mobile agent includes,
    querying the corresponding target node for the valid trust token,
    querying at least one trust center node and,
    querying the memory storing the valid trust token in correspondence to nodes of the network.

5. The method according to claim 4 wherein a list of nodes is attached to the predetermined mobile agent and the mobile agent is permitted to migrate to a node of the list without verifying if a valid trust token exists for the node.

6. The method according to claim 1 wherein the list includes a plurality of trust centers.

7. The method according to claim 1 wherein the checking and generating are executed by a trust center and a generated trust token includes a data field corresponding to the level of trust ascribed to the at least one node.

8. The method according to claim 1 wherein the trust token includes an expiration date.

9. The method according to claim 1 wherein the trust token center includes a database and a processor.

10. The method according to claim 1 wherein the checking of the at least one node of the network includes checking software of the execution environment.

11. A computer readable storage medium including stored computer program instructions which cause a computer to implement a method of managing a communication network comprising:
    checking at least one node of the network in relation to a predetermined mobile agent to determine whether or not the at least one node provides a trusted execution environment with respect thereto;
    generating a trust token for the checked node at a trust center if the checking exceeds a preset trust threshold and storing the trust token in a memory of the trust center, the trust token indicating that the corresponding node has passed the checking and the trust token includes a name of the trust center that issued the trust token;
    verifying if a valid trust token exists for the corresponding node in advance to a migration of the predetermined mobile agent to a node of the network; and
    migrating the predetermined mobile agent by sending the predetermined mobile agent exclusively to nodes having the valid trust token,
    wherein a list of trust center nodes is attached to a mobile agent, a trust token which is issued by a trust center of the list is a valid trust token, a trust token which is not issued by a trust center of the list is not a valid trust token, and the list includes trust centers which are specified by an owner of the mobile agent.

12. The computer readable storage medium of claim 11 wherein the checking of the at least one node of the network includes checking software of the execution environment.

13. A communication network comprising:
    at least one trust center node configured to check at least one node of the network in relation to a predetermined mobile agent to determine whether or not the at least one node provides a trusted execution environment, and in case the checking exceeds a preset trust threshold, the trust center node employing a token creator configured to generate a trust token for the checked node, the trust center node being another node of the network; and
    a first node providing an execution environment for a mobile agent including
        verifying, with a processor, if a valid trust token exists for the corresponding node in advance to a migration of the predetermined mobile agent to a node of the network, and
        migrating the predetermined mobile agent by sending the mobile agent exclusively to nodes having the valid trust token,
    wherein the trust token and the corresponding checked nodes are identified in a memory as a trust manager database operably linked to the trust center node, and the trust token includes a name of the trust center that issued the trust token, and
    wherein a list of trust center nodes is attached to a mobile agent, a trust token which is issued by a trust center of the list is a valid trust token, a trust token which is not issued by a trust center of the list is not a valid trust token, and the list includes trust centers which are specified by an owner of the mobile agent.

14. The communication network of claim 13 further comprising:

at least one mobile agent place managing the migration of mobile agents in the communication network, the mobile agent place being designed to access the trust manager database of at least one trust center node.

15. The communication network according to claim 14 wherein the mobile agent place comprises:

a local database to store information fetched from the trust manager database of a trust center node.

16. The communication network according to claim 13 wherein the list includes a plurality of trust centers.

17. The communication network according to claim 13 wherein a list of nodes is attached to the predetermined mobile agent and the mobile agent is permitted to migrate to a further node if the further node is on the list without verifying if a valid trust token exists for the further node.

18. The communication network according to claim 13 wherein the generated trust token includes a data field corresponding to a level of trust that is ascribed by the trust center to the at least one node.

19. The communication network of claim 13 wherein the checking of the at least one node of the network includes checking software of the execution environment.

* * * * *